United States Patent [19]

Pavlov et al.

[11] Patent Number: 4,614,861
[45] Date of Patent: Sep. 30, 1986

[54] UNITARY, SELF-CONTAINED CARD VERIFICATION AND VALIDATION SYSTEM AND METHOD

[75] Inventors: Leonidas P. Pavlov; Nabil M. Aba-Jbara, both of Colorado Springs, Colo.

[73] Assignee: Intellicard International, Inc., Colorado Springs, Colo.

[21] Appl. No.: 671,748

[22] Filed: Nov. 15, 1984

[51] Int. Cl.⁴ .............................................. G06K 5/00
[52] U.S. Cl. ..................... 235/380; 235/379; 235/381
[58] Field of Search .................. 235/380, 379, 381

[56] References Cited

U.S. PATENT DOCUMENTS

| | | | |
|---|---|---|---|
| 3,641,498 | 2/1972 | Hedin | 340/164 R |
| 3,705,294 | 12/1972 | Kuehnle | 235/61.12 N |
| 3,866,173 | 2/1975 | Moorman | 340/149 A |
| 3,894,756 | 7/1975 | Ward | 283/7 |
| 3,906,460 | 9/1975 | Halpern | 340/172.5 |
| 3,919,447 | 11/1975 | Kilmer | 428/138 |
| 3,971,916 | 7/1976 | Moreno | 235/61.7 B |
| 3,996,450 | 12/1976 | Kerkhoff | 235/61.7 B |
| 4,001,550 | 1/1977 | Schatz | 235/61.7 B |
| 4,092,524 | 5/1978 | Moreno | 235/419 |
| 4,102,493 | 7/1978 | Moreno | 235/419 |
| 4,105,156 | 8/1978 | Dethloff | 235/441 |
| 4,209,782 | 6/1980 | Donath | 340/147 MD |
| 4,211,919 | 7/1980 | Ugon | 235/487 |
| 4,213,118 | 7/1980 | Genest | 340/149 R |
| 4,256,955 | 3/1981 | Giraud | 235/380 |
| 4,277,837 | 7/1981 | Stuckert | 364/900 |
| 4,283,710 | 8/1981 | Genest | 340/149 R |
| 4,295,041 | 10/1981 | Ugon | 234/487 |
| 4,298,793 | 11/1981 | Melis | 235/487 |
| 4,341,951 | 7/1982 | Benton | 235/379 |
| 4,382,279 | 5/1983 | Ugon | 364/200 |
| 4,408,119 | 10/1983 | Decavele | 235/382 |
| 4,434,473 | 2/1984 | Ugon | 364/900 |
| 4,446,475 | 5/1984 | Gereckci | 357/40 |
| 4,453,074 | 6/1984 | Weinstein | 235/380 |
| 4,523,087 | 6/1985 | Benton | 235/380 |
| 4,529,870 | 7/1985 | Chaum | 235/379 |

Primary Examiner—Harold I. Pitts
Attorney, Agent, or Firm—William W. Cochran, II

[57] ABSTRACT

A unitary, self-contained card (10) which does not require interaction with a fixed terminal device to prevent monitoring of confidential information contained within the card (10). The unitary, self-contained card (10) has the ability to verify a personal identification number (PIN) which is entered directly into the card by way of a keyboard (12) without the use of an outside terminal and produce a transaction identification code (TIC) which varies for each transactional use of the card (10) and which can later be verified to determine the validity of the transaction. The card (10) is capable of storing issue and expiration dates, credit limit balances and other card transactional data. The card (10) can be used in conjunction with a validation system (102) with provisions for verifying information recorded on the magnetic indicia (22) of the card (10). The card (10) can also be used with peripheral devices (96) which function to verify the validity of the transaction from the transaction identification code (TIC).

27 Claims, 14 Drawing Figures

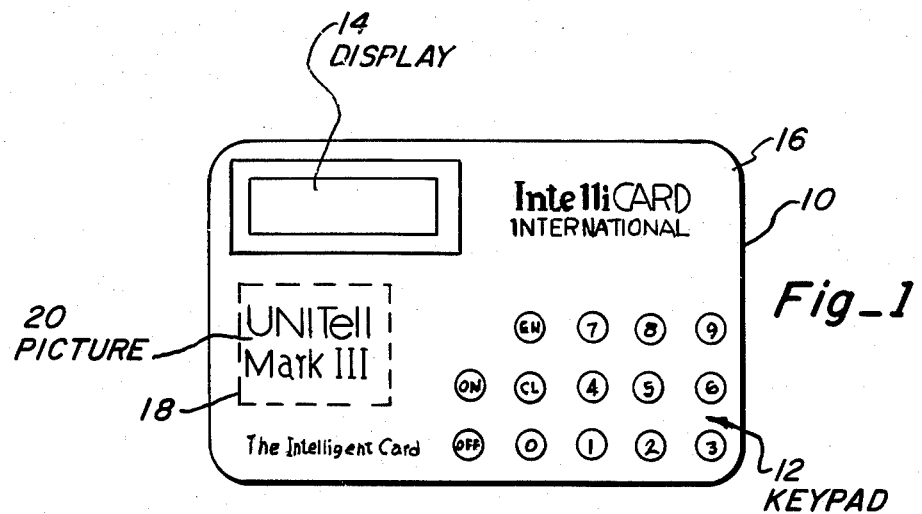
Fig_1
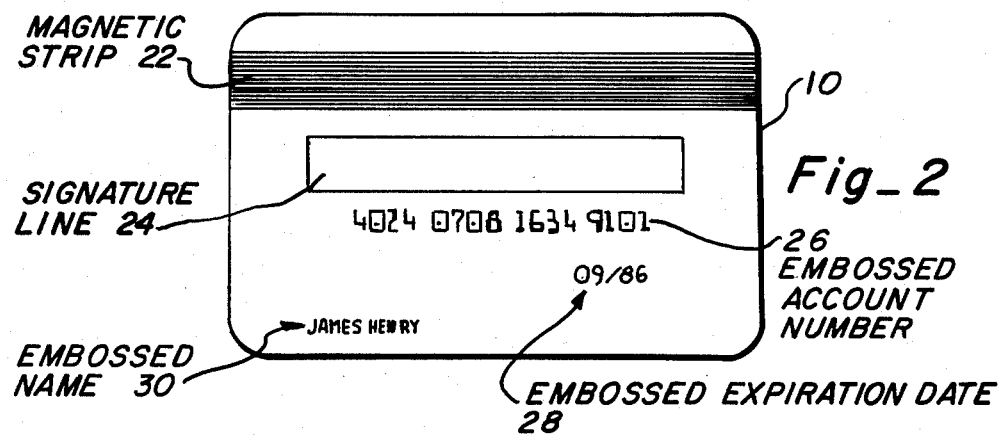
Fig_2
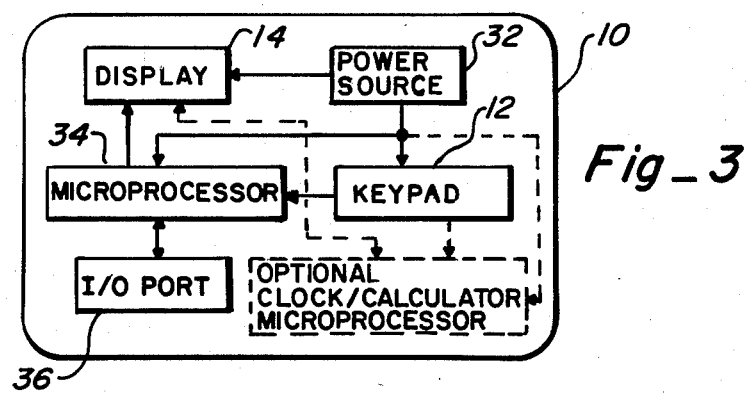
Fig_3

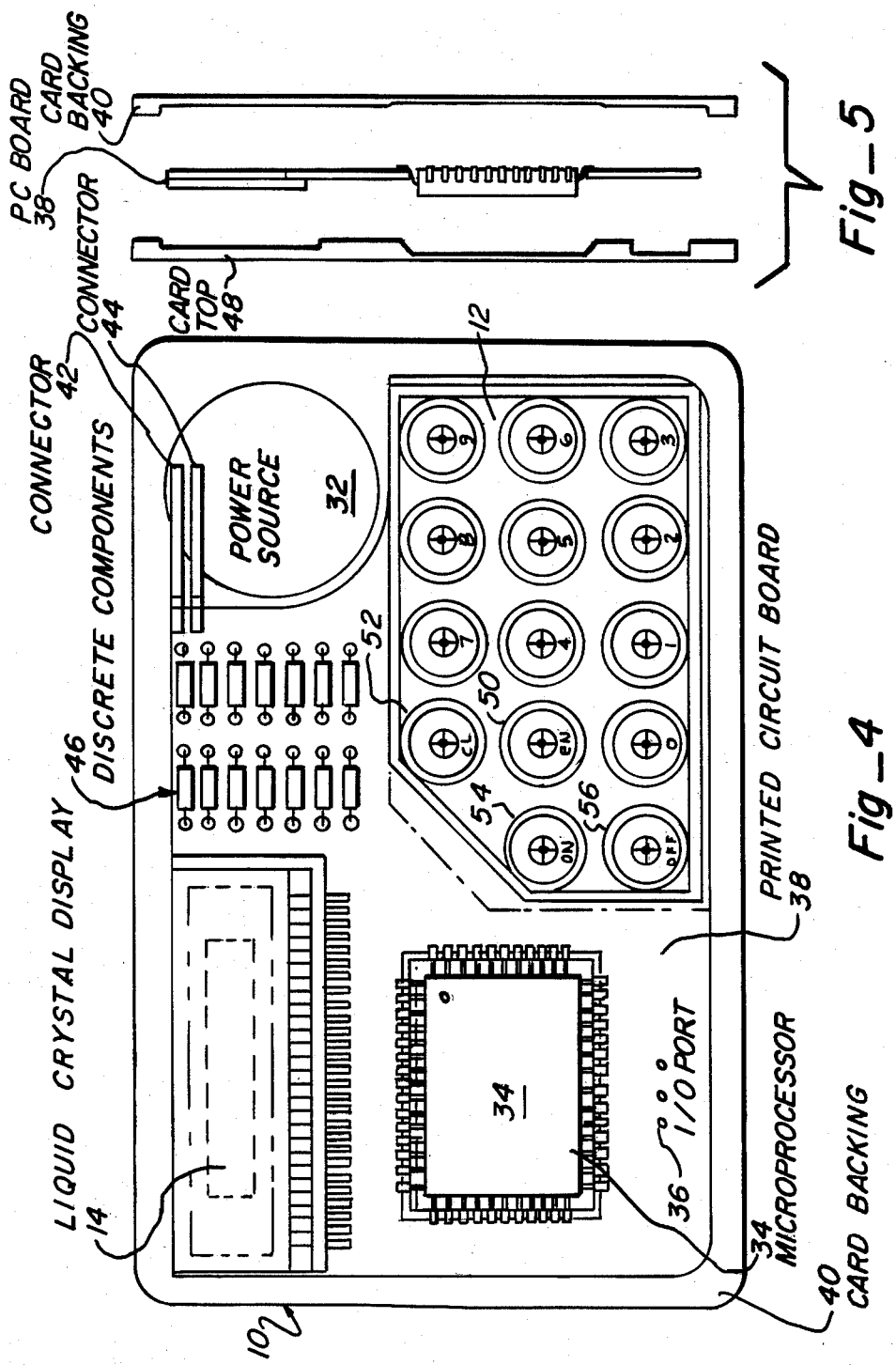

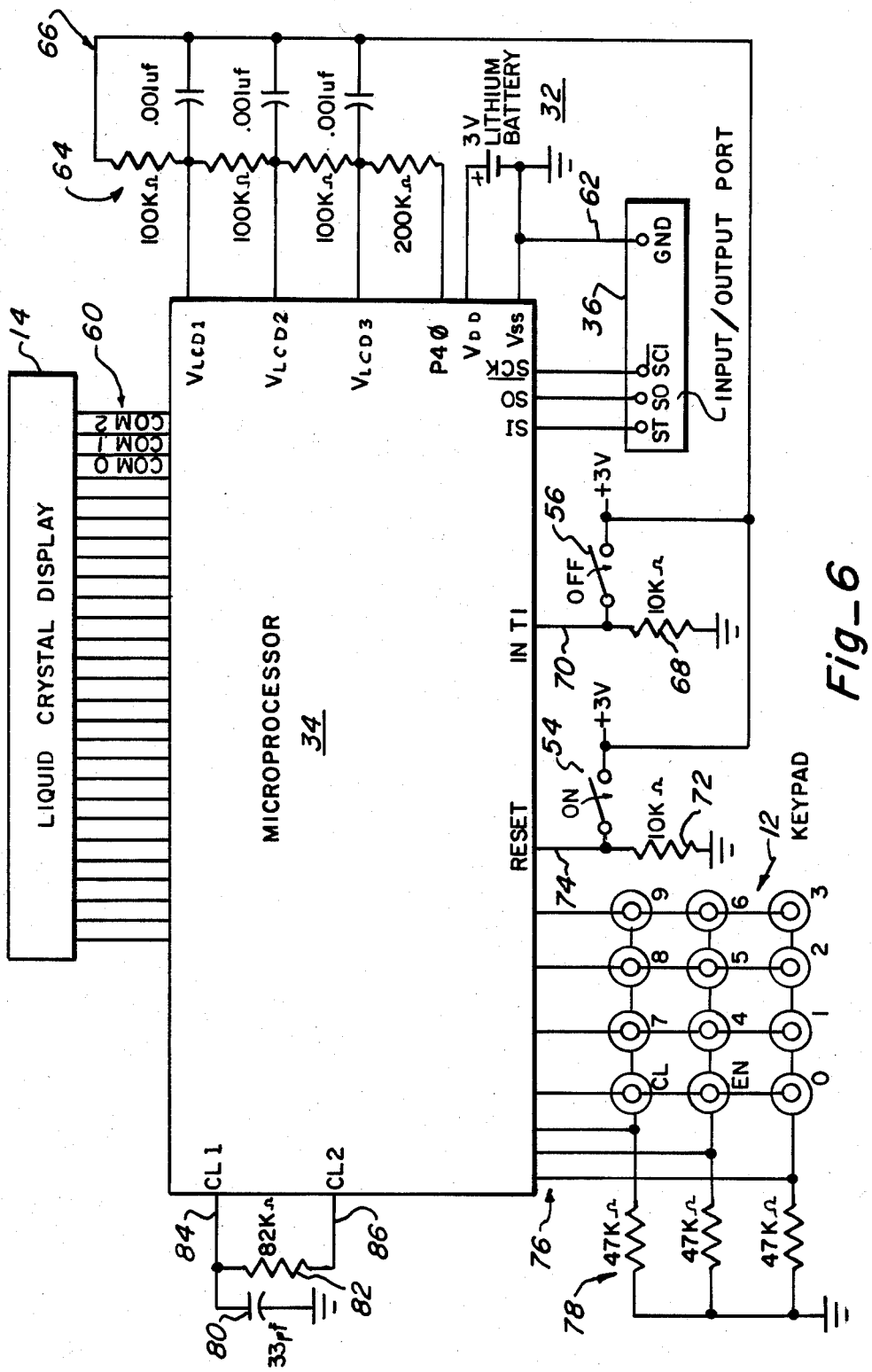
Fig_6

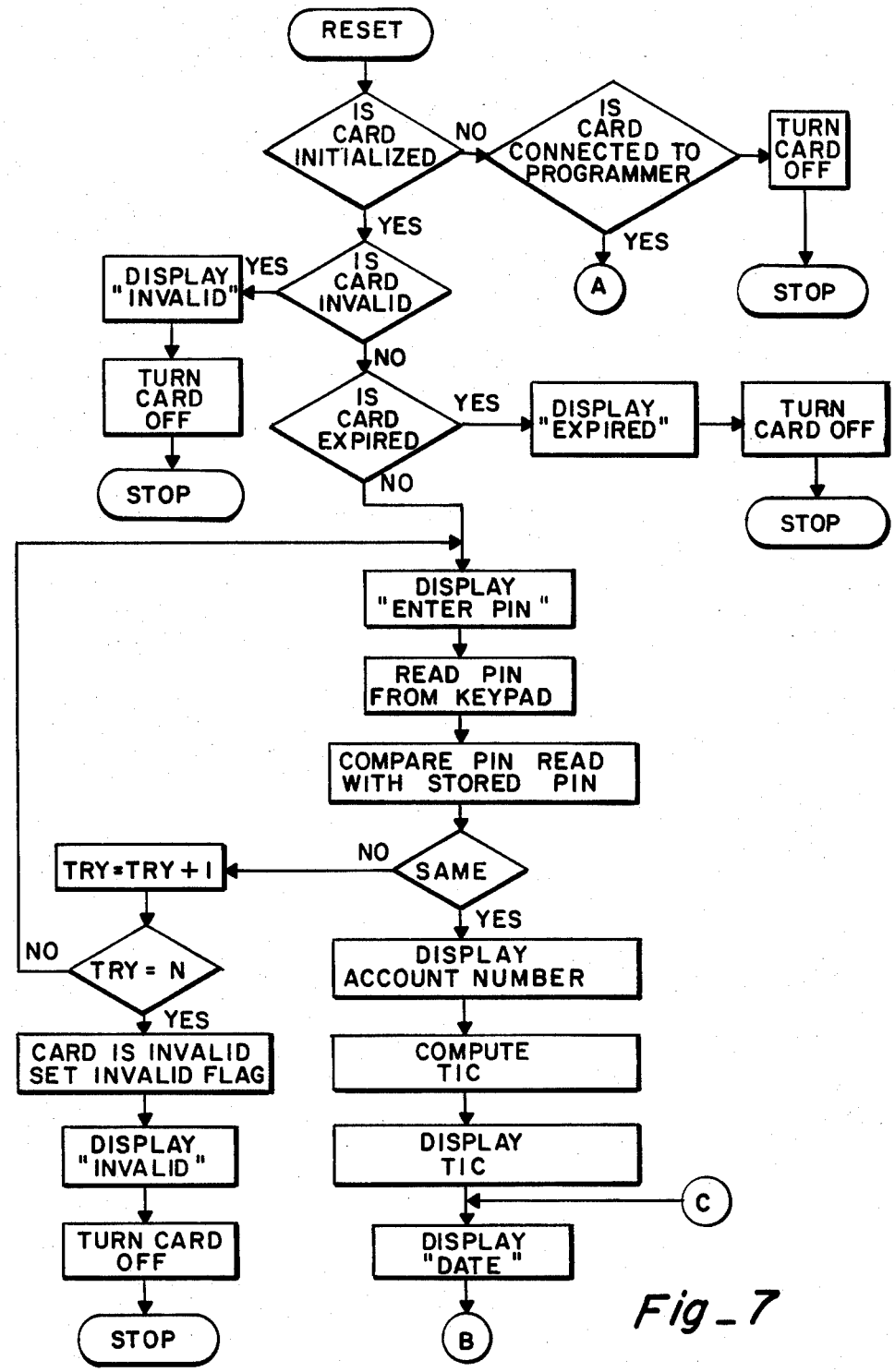
Fig_7

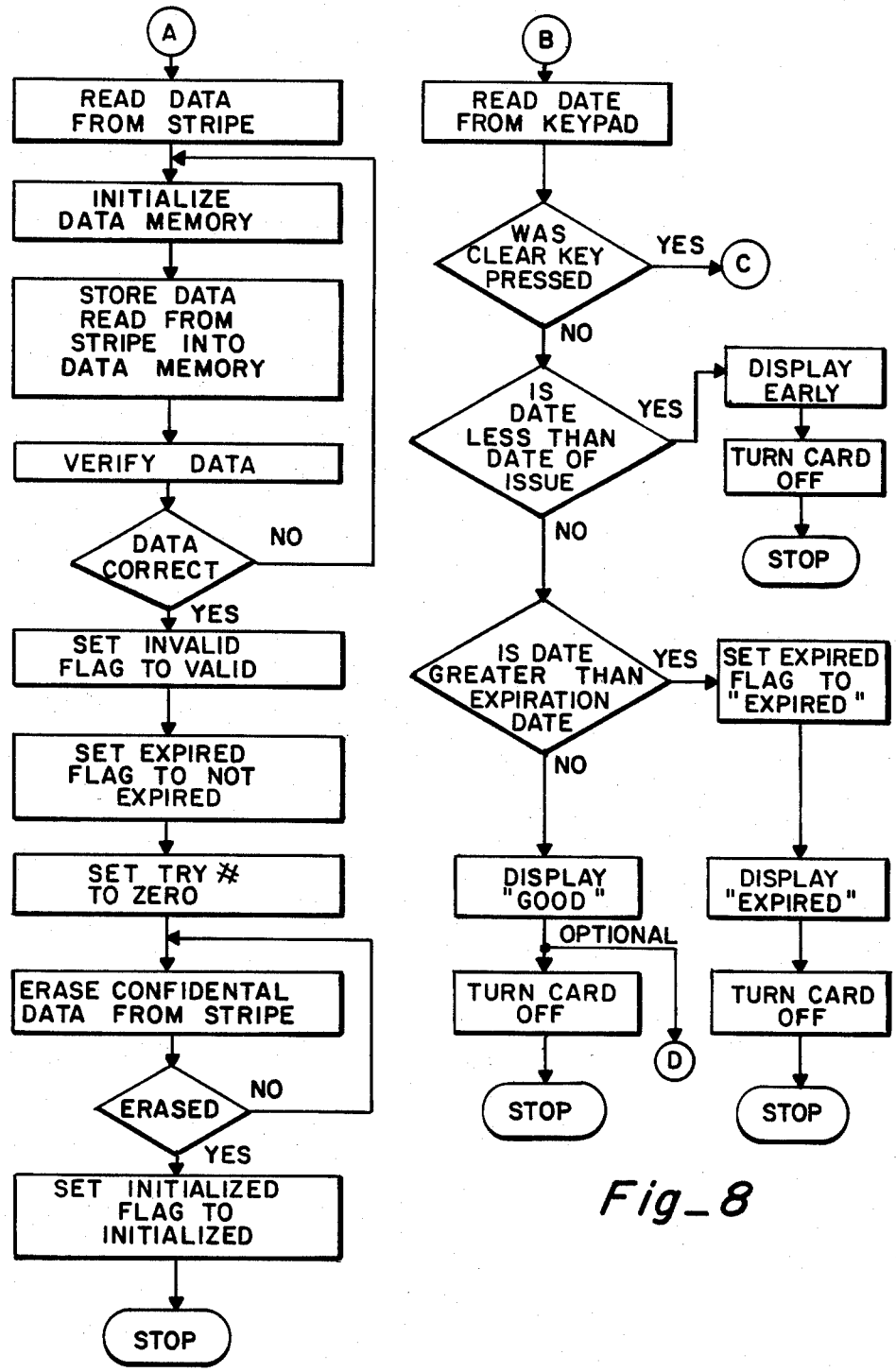

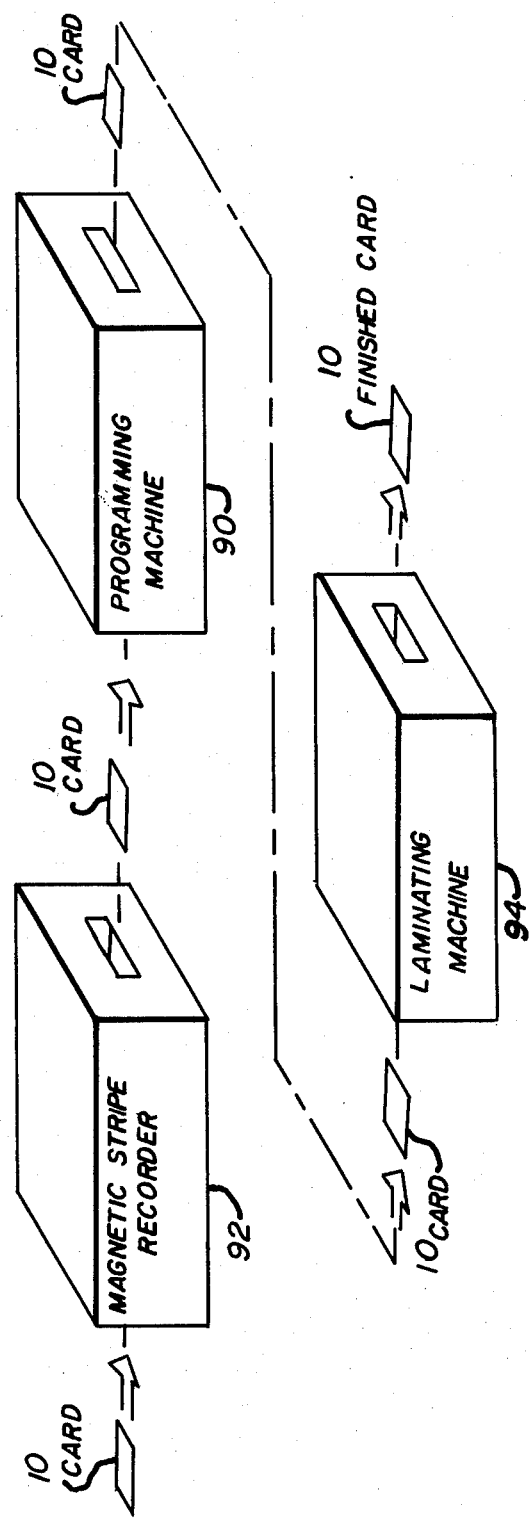

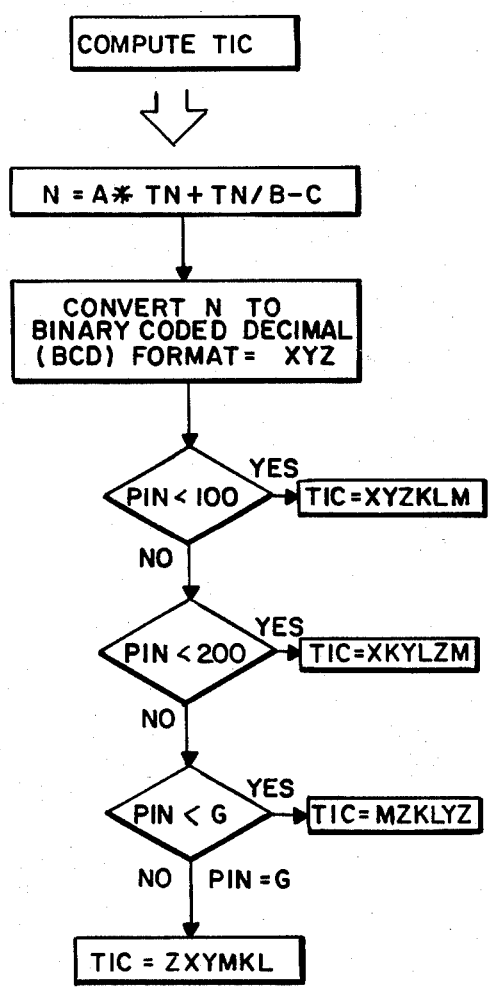
Fig_12
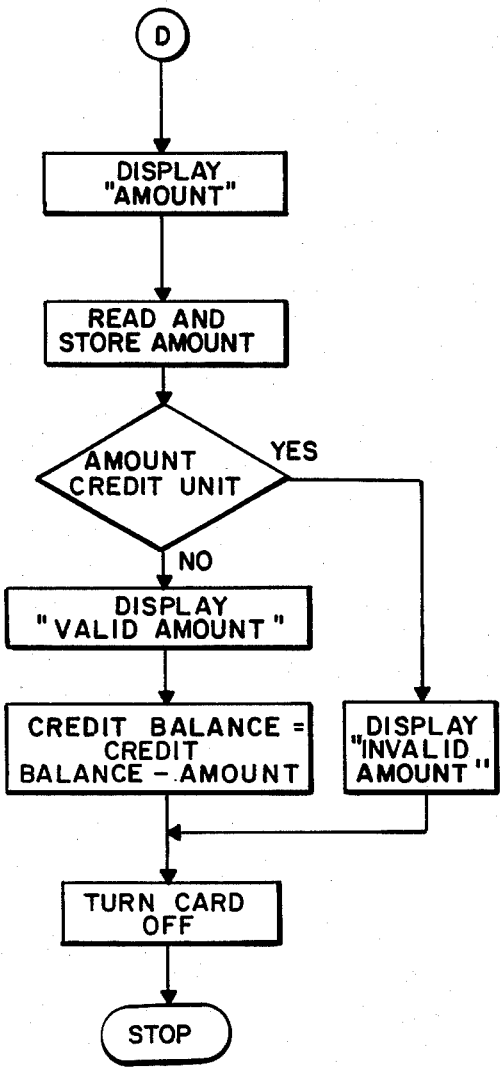
Fig_11

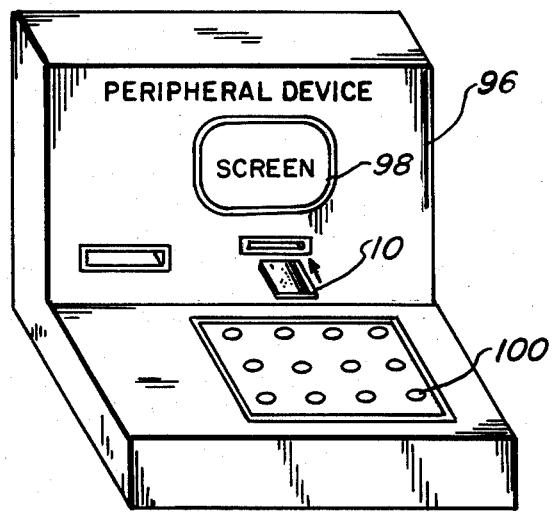
Fig_ 13
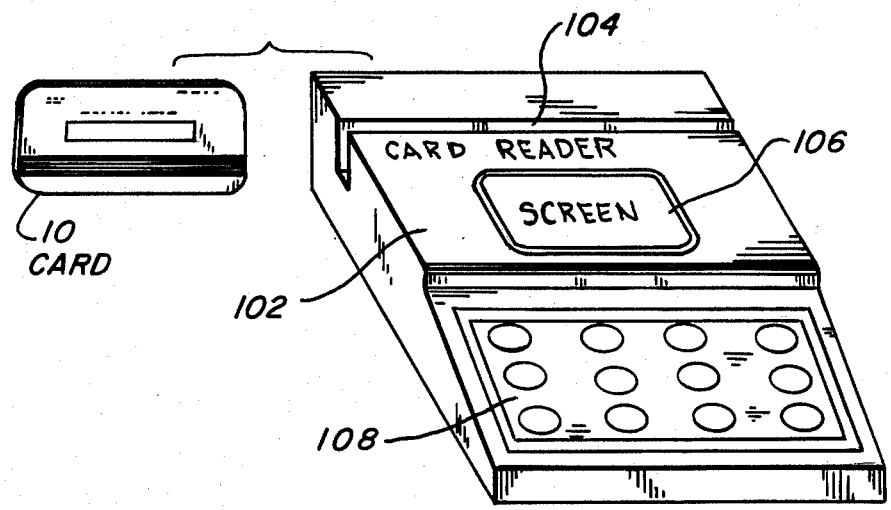
Fig_ 14

UNITARY, SELF-CONTAINED CARD VERIFICATION AND VALIDATION SYSTEM AND METHOD

BACKGROUND OF THE INVENTION

1. Field of Invention

The present invention pertains generally to data processing devices and methods and more particularly to a transaction and identification system employing a unitary self-contained transaction card which uses data processing techniques to verify the user of the card and validate its use.

2. Discussion of the Background of the Invention

The use of transaction cards has increased greatly in the past few years. Transaction cards have been employed as credit cards, debit cards, access control cards to control security by limiting access to designated areas, identification cards, automatic teller machine cards for obtaining money from currency dispensing machines, etc.

Examples of inventions relating to the application of transaction cards are disclosed in the following patents:

| U.S. Pat. No. | Inventor | Date |
| --- | --- | --- |
| 3,641,498 | Hedin | Feb. 8, 1972 |
| 3,705,294 | Kuehnle et al. | Dec. 5, 1972 |
| 3,866,173 | Moorman et al. | Feb. 11, 1975 |
| 3,894,756 | Ward | July 15, 1975 |
| 3,906,460 | Halpern | Sept. 16, 1975 |
| 3,919,447 | Kilmer el al. | Nov. 11, 1975 |
| 3,971,916 | Moreno | July 27, 1976 |
| 3,996,450 | Kerkhoff | Dec. 7, 1976 |
| 4,001,550 | Schatz | Jan. 4, 1977 |
| 4,092,524 | Moreno | May 30, 1978 |
| 4,102,493 | Moreno | July 25, 1978 |
| 4,105,156 | Dethloff | Aug. 8, 1978 |
| 4,209,782 | Donath et al. | June 24, 1980 |
| 4,211,919 | Ugon | July 8, 1980 |
| 4,213,118 | Genest et al. | July 15, 1980 |
| 4,256,955 | Giraud et al. | March 17, 1981 |
| 4,277,837 | Stuckert | July 7, 1981 |
| 4,283,710 | Genest et al. | Aug. 11, 1981 |
| 4,295,041 | Ugon | Oct. 13, 1981 |
| 4,298,793 | Melis et al. | Nov. 3, 1981 |
| 4,341,951 | Benton | July 27, 1982 |
| 4,382,279 | Ugon | May 3, 1983 |
| 4,408,119 | Decavele | Oct. 4, 1983 |
| 4,434,473 | Michel et al. | Feb. 28, 1984 |
| 4,446,475 | Gercekci et al. | May 1, 1984 |
| 4,453,074 | Weinstein | June 5, 1984 |
| UK Patent Application 2 088 605 A | | |
| European Patent Application 0028965 | | |

U.S. Pat. No. 3,641,498 issued to Hedin discloses an identification card for use in a security access system. The identification card functions as a key that interacts with a peripheral device such as disclosed in FIG. 7 for gaining access to a secured area.

U.S. Pat. No. 3,705,294 issued to Kuehnle et al. discloses a data card which can be encoded by a user by removal of material at specified bit locations to change the light reflection characteristics at the bit locations. The card can then be identified by an optical reading device.

U.S. Pat. No. 3,866,173 issued to Moorman et al. discloses an access control system for controlling the entry and exit of personnel through a door or gate of a restricted area. A person seeking to enter a restricted area inserts a personal identification card having magnetically encoded data thereon into a card reader located adjacent the restricted area. The user then inserts a secret number into a keyboard associated with a card reader. The system performs checks on the card and keyboard data to determine if the person seeking to enter the restricted area is authorized to enter the area. A written record of attempts to enter the area is kept by the system. The system also includes a card erase mechanism which erases the magnetically recorded card data after a predetermined number of unsuccessful attempts to enter the restricted area.

U.S. Pat. No. 3,894,756 issued to Ward discloses an identification card employing a coded holograph. The identification card can be used on credit cards and personal access ID cards. The identifying indicia includes the user's name, signature and photograph.

U.S. Pat. No. 3,906,460 issued to Halpern discloses a system which utilizes a portable data token which stores information in a data transfer device for affecting data transfer between the portable data token and an associated computer. In accordance with this system, data is retrieved from the portable data token processed in the computer and the resulting data may be stored in a portable data token. The data token can store data relating to available credit balance, account number and can be disabled after application of a predetermined number of erroneous validation characters.

U.S. Pat. No. 3,919,447 issued to Kilmer et al. discloses a card suitable for use in identifying both people and objects. The card uses a selectively apertured film which is laminated over another film having a transmission band pass in the infra-red region. The two films provide an optically readable identification card.

U.S. Pat. No. 3,971,916 issued to Moreno discloses a flat card containing incapsulated logic microstructures for carrying data relating to a bank account. The card cooperates with a data transfer device comprising a card reader. Coupling of data between the card and the card reader is affected optically by light emitting diodes and photovoltaic cells, or by direct electrical contact. Credit balances are maintained by the Moreno data storage system.

U.S. Pat. No. 3,996,450 discloses a device for changing the secret number used in association with a coded credit card.

U.S. Pat. No. 4,001,550 issued to Schatz discloses a funds transfer and identification card which is used in conjunction with an electronic terminal. The card includes a random access memory for storing account information. The terminal functions to determine the credit status of the account from the information provided by the random access memory of the card and updates the information on the card so that the card can maintain a record of the account status.

U.S. Pat. No. 4,092,524 issued to Moreno discloses a portable device which contains electronic circuitry to process data. The portable device is inserted in a terminal and a confidential code supplied by the rightful owner is entered into the terminal and electronically coupled to the portable device. The portable device includes circuitry for storing errors in the confidential code attempted to be entered through the terminal device.

U.S. Pat. No. 4,102,493 issued to Moreno discloses a system for storing and transferring data in a confidential manner which uses a portable article having electronic logic microstructures included therein for interaction with a transfer device such as a terminal. The portable article includes a storage medium for storing data and functions to compare confidential data introduced into the transfer device with the data stored in the storage medium.

U.S. Pat. No. 4,105,156 issued to Dethloff discloses an identification card with electronic circuitry including a memory device for storing a secret number used with the card. When the secret number is entered into the card the first time, an input gate is destroyed so that the secret number cannot be altered. The card operates in conjunction with a verifying means which receives the card and checks the identity and entitlement of the user.

U.S. Pat. No. 4,209,782 issued to Donath et al. discloses a security access system employing electronic locks and keys which grant access to secured areas. Release of the locks is dependent upon the coincidence of code pairs of the lock and key.

U.S. Pat. No. 4,211,919 issued to Ugon discloses a portable data or information carrier in the form of a card which employs an internal electronic memory having a secret zone wherein a key or code number is stored. An external terminal is used to enter the key or code number into the card which compares to the stored key number to determine whether the particular operation is authorized.

U.S. Pat. No. 4,213,118 issued to Genest et al. discloses a combination changing system for controlling access to a locked area and updating a lock combination. The lock code combination is automatically changed each time a new key card is used. The system employs both lock and key devices for operation.

U.S. Pat. No. 4,256,955 issued to Giraud et al. discloses a credit card system including a credit card containing a memory for storing coded information indicative of identification of the use for which the article is intended and identification of units used to keep track of operations which are performed in connection with the credit card and the number of units available to the holder of the credit card. The system includes the use of a peripheral device in combination with an identification code. The system has the ability to both check and update the credit limits.

European Pat. No. 0028965 discloses a personal identification system for access control. The device requires interaction with a terminal adjacent the secured area which calculates a function for allowing access.

U.S. Pat. No. 4,277,837 issued to Stuckert discloses a personal portable terminal for financial transactions which is used in conjunction with a terminal called a transactor. The system functions to continually monitor and record an individual's financial records including debiting and crediting accounts. Key input and display capabilities allow transactions to be verified by both parties before the transaction is entered on the personal data storage and transfer card.

U.S. Pat. No. 4,283,710 issued to Genest et al. discloses an access control system which includes provisions for updating lock code combinations.

U.S. Pat. No. 4,295,041 issued to Ugon discloses an intelligent portable data carrier which accesses an external device. The data carrier carries a code in its memory which is accessed by the external device to verify authorization of the data carrier. The data carrier can comprise a card as suggested by Ugon.

U.S. Pat. No. 4,298,793 issued to Melis et al. discloses a portable element shaped as a card for receiving, storing, displaying and outputting data in numerical or alpha-numerical characters. The Melis et al. system communicates with a reservation system and exchanges data therewith. The Melis et al. system uses contactless communication between the portable element and the reservation device.

U.K. Patent Application GB No. 2 088 605 A discloses an identification card or data carrier which contains a confidential code known only to the lawful owner of the card. The code is stored in an integrated circuit disposed in the card. The identification code is compared in the integrated circuit. To prevent unauthorized use of the card, an independent circuit, isolated from the rest of the circuit, is provided to detect the insertion of incorrect codes and render the card inoperable for a predetermined period of time upon the insertion of an incorrect code.

U.S. Pat. No. 4,341,951 issued to Benton discloses an electronic funds transfer and voucher issue system for transferring electronic funds data in lieu of cash between vendees and vendors. Each vendee is provided with an identification card and a portable electronic device which are both presented to the vendor upon making a purchase. The vendee inserts the identification card into the portable electronic device which reads a card identification number from the machine readable indicia on the card. The card identification number is compared with a card identification number stored in memory in the electronic device. If these numbers are not equal, indicating that the inserted identification card is not the one issued to the portable electronic device, further operation of the portable electronic device is automatically stopped. A personal identification number (PIN) is inserted by the vendee by way of a keyboard on the portable electronic device. This number is compared with a personal identification number (PIN) stored in memory in the portable electronic device to energize an invalid lamp on the portable electronic device. The number of incorrect entries of the PIN number is accumulated. The portable electronic device also stores a credit limit balance which is automatically decremented for each transaction. Also, upon favorable comparison of the card identification number read from the machine readable indicia on the card and the stored card identification number, the number is displayed which is the logarithm of the card identification number. This number is viewed by the vendor and written onto the voucher to verify that vendor has actually viewed the portable electronic device and thereby provide additional security. The portable electronic device also has the capability of interacting with an additional device, such as a fixed unit, located at a sponsoring institution for generating credit data.

U.S. Pat. No. 4,382,279 issued to Ugon discloses a single chip microprocessor with on-chip modifiable memory. The microprocessor uses a microprocessor architecture which permits automatic programming of non-volatile memory.

U.S. Pat. No. 4,408,119 issued to Decavele discloses individualized portable object such as a credit card which is intended to cooperate with a terminal. The user of the card supplies an authorization code through the terminal. A verifier circuit disposed within the card verifies whether or not the entered code is the proper authorization code. The proper authorization code must be supplied within a predetermined number of attempts or otherwise the object is invalidated.

U.S. Pat. No. 4,434,473 issued to Michel et al. discloses a method and device for storing logic representations of process states.

U.S. Pat. No. 4,446,475 issued to Gercekci et al. discloses an integrated circuit chip having a digital memory wherein direct access to at least a portion of the memory is prevented. A security code can be programmed into a portion of the memory when it is attached to a wafer probe. An integrated circuit chip is removed from the wafer coupling lines between the contact pads and the memory buffer is destroyed so as to prevent access to this portion of the memory.

U.S. Pat. No. 4,453,074 issued to Weinstein discloses a protection system for intelligent credit cards based upon the encryption of the user's secret pass word. The intelligent card includes a microprocessor and an interface connection with a remote terminal. The intelligent card also includes a memory containing the user's secret password.

Consequently, various systems have been disclosed in the prior art for providing a transaction device which prevents the use of such devices in a fraudulent manner. As disclosed above, these devices have memories which are readable magnetically, optically or electronically. Both optical and magnetic storage of data suffer from small storage capacity, ease of fraudulent access and modification of the memory's contents and the susceptibility of such media to erasure due to heat and magnetic fields. These disadvantages are more specifically outlined in U.S. Pat. No. 3,971,916 issued to Moreno on July 27, 1976.

To overcome the problems associated with magnetically encoded and optically encoded cards, various systems have been designed to use electrical microstructures in the form of electronic integrated circuits. With the advent of the development of LSI and VSLI circuitry semiconductor memories, microprocessors and other logic circuitry can be disposed directly in a card structure as disclosed in the various patents referenced above.

An essential concept employed in conjunction with transaction card systems, to prevent fraud is the use of a secret number commonly known as a personal identification number (PIN) which is known by the user of the card. The PIN functions to identify and verify the user of the card in a transaction. As stated above, the transaction can take the form of a credit or debit transaction accessing a secured area, obtaining money from an automatic teller machine, and various other security type transactions. Electronic microstructures have allowed data to be stored electronically in the card and have provided a great deal of security in preventing access, modification and erasure of that data.

Each of these devices disclosed in the prior art, however, requires interaction with a terminal or transfer device which comprises a fixed terminal type device capable of communicating transaction data. Typically, the card holds in its memory a preprogrammed secret code (PIN) and other confidential and nonconfidential information in a memory located on the card. When the card is to be used, it is inserted in the terminal and the PIN is entered by the user into a terminal keyboard. Either a processor located within the terminal or on the card verifies whether the entered PIN is correct, and if so, the transaction proceeds in the manner disclosed in the above-referenced patents. If the code is incorrect, the user may be allowed to try entering the proper code a preprogrammed number of times until the process is terminated or the card is either temporarily or permanently disabled.

The use of external terminals in conjunction with cards results in a number of disadvantages and limitations. For example, it is necessary to have a terminal at each of the locations where the cards are to be used. This comprises a significant cost in implementing such a system because of the large number of terminals that are required and the attendant cost of installation and maintenance.

Another disadvantage introduced by the use of external terminals is that of reliability. Because of the complexity of such terminals, there is a high probability that they will be inoperable for a certain fraction of their useful lifetimes. Inoperability of the terminal device, in certain applications, would not be appropriate, such as in access control applications. Duplication of terminal devices to overcome problems of down time further increases the cost of the system.

Another disadvantage resulting from the use of external terminals is the lack of security which naturally results from the communication between the card and the terminal. This communication can be easily intercepted and monitored by criminals knowledgeable in the field of electronics. Although systems have been developed to guard against losses which may occur due to monitoring of communications between a card and the terminal, such as disclosed in the above-referenced U.S. Pat. No. 4,453,074 issued to Weinstein which discloses a sophisticated encryption/description algorithm, the systems are quite complex and still allow the monitoring of data through communications between the card and a terminal.

Additionally, considerable time and expense would be required to change existing systems such as credit card systems using machine readable indicia to fixed terminal/card systems. As a result of these problems, implementation of systems such as those proposed in the above-referenced patents have not been widely accepted even though losses in card transaction systems, such as credit card systems, are in the billions of dollars each year.

SUMMARY OF THE INVENTION

The present invention overcomes the disadvantages and limitations of the prior art by providing a unitary self-contained card for visually displaying card verification information to verify proper use of the card comprising a data entry device for entering card user data into the card, an electronic memory for storing preselected card verification data associated with the card, a data processing device for comparing the card user data with the preselected card verification data to produce card verification signals, and a display for displaying the card verification information in response to the card verification signals. The data processing device produces a transaction identification code which is a function of a transaction key number produced by the data processing device. The function can comprise an algorithm stored in the electronic memory means. The preselected card verification data can include issue and expiration dates of the card, a personal identification number (PIN), a credit limit balance, the number of incorrect attempts to enter a personal identification number (PIN) and an account number.

The present invention may also comprise a card actuated system comprising a unitary self-contained card for visually displaying card verification information comprising a card entry device for entering a personal identification number (PIN) into the card, an electronic memory for storing a predetermined personal identification number (PIN) associated with the card, a data processing device for comparing the personal identification number (PIN) entered through the card entry device with the predetermined personal identification number (PIN) stored in the electronic memory device to generate a transaction identification code by execution of an encryption algorithm stored in the electronic memory device using a transaction key number produced by the data processing device, a card display for displaying the transaction identification code, a machine readable indicia disposed on the card for storing an account code associated with the card; a peripheral control device which functions in response to actuation of the card comprising a card reader for reading the account code from the machine readable indicia on the card, a peripheral control entry device for entering the transaction identification code and the personal identification number (PIN) into the peripheral control device, logic means for comparing a predetermined personal identification number (PIN) associated with the account number with the personal identification number (PIN) entered through the peripheral control entry device, a verification device for verifying the transaction identification code from the encryption algorithm to validate operation of the system upon verification of the transaction identification code and favorable comparison of the predetermined personal identification number (PIN) and the personal identification number (PIN) entered through the peripheral control entry device.

The present invention also comprises a card verification and validation system comprising a unitary self-contained card for visually displaying card verification information to allow verification of proper use of the card comprising data entry means for entering a personal identification number (PIN) into the card, electronic memory means for storing an account code and a predetermined personal identification number (PIN) associated with the card, data processing means for comparing the personal identification number (PIN) entered through the data entry means with the predetermined personal identification number (PIN) stored in the electronic memory means to generate a PIN verification signal, and for generating a transaction identification, which is a function of a transaction key number produced by the data processing device for each transactional use of the card, a card display device for displaying the transaction identification code for recordation and verification, the PIN verification signal to verify that the proper personal identification number (PIN) was entered in the data entry device and an account code to allow visual comparison of the account codes stored in the electronic memory means with the account code embossed on the card, machine readable indicia means disposed on the card for storing an account code associated with the card; a validation device for validating use of the card comprising card reader means for reading the account code from the machine readable indicia, a validation display for displaying the account code read from the machine readable indicia to allow visual comparison of the account code read from the machine readable indicia and the account code displayed on the card to verify the account code stored on the machine readable indicia, a comparison device for comparing the account code read from the machine readable indica with stored account codes to produce a validation signal for display on the validation device.

The present invention also comprises a method of manufacturing a consumer transaction card comprising assembling the consumer transaction card with an accessible input/output port connected to an electronic storage and data processing device disposed on the card, providing a machine readable indicia on the card, storing both confidential and nonconfidential information on the machine readable indicia, reading and storing the confidential and nonconfidential information from the machine readable indicia, erasing the confidential information from the machine readable indicia, storing the confidential and nonconfidential information in the electronic storage and data processing device via the input/output port, covering the input/output port with an additional structural layer of the card to prevent access to the input/output port without physically altering the card.

A primary advantage of the present invention is that it uses a unitary self-contained card which does not interact with a fixed terminal device and thereby prevents monitoring of confidential information during communication between the card and a fixed terminal device. The unitary self-contained card has the ability to verify the personal identification number (PIN) which is entered directly into the card without the use of a terminal and produce a transaction identification code which varies for each transactional use of the card and which can be later verified to determine the validity of the transaction. The card is also capable of storing issue and expiration dates, credit limit balance and other card transactional data. The card can also be used in conjunction with a validation system with provisions for verifying the information recorded on the machine readable indicia of the card. The unitary self-contained card of the present invention can also be used with peripheral devices such as access control devices and automatic teller machines wherein the transaction identification code generated by the card is entered into the peripheral device which functions to verify the validity of the transaction from the transaction identification code.

BRIEF DESCRIPTION OF THE DRAWINGS

An illustrative and presently preferred embodiment of the invention is shown in the accompanying drawings, wherein:

FIG. 1 is a front view of the unitary self-contained card of the present invention.

FIG. 2 is a back view of the unitary self-contained card illustrated in FIG. 1.

FIG. 3 is a schematic block diagram of components disposed in the unitary self-contained card of the present invention.

FIG. 4 is a schematic diagram illustrating the layout of the components of the unitary self-contained card of the present invention.

FIG. 5 is an end view assembly drawing of the device illustrated in FIG. 4.

FIG. 6 is a schematic diagram of the electronic components of the unitary self-contained card of the present invention.

FIGS. 7, 8, 9, 11 and 12 are flow diagrams illustrating the operation of the unitary self-contained card of the present invention.

FIG. 10 is a schematic diagram illustrating the method of manufacture of the unitary self-contained card of the present invention.

FIG. 13 is a schematic diagram illustrating use of the unitary self-contained card of the present invention with a peripheral device.

FIG. 14 is a schematic diagram illustrating use of the unitary self-contained card of the present invention with a card verification device.

DETAILED DESCRIPTION OF THE INVENTION

FIG. 1 illustrates the unitary self-contained card 10 of the present invention. Card 10 can take the form of a standard size transaction card such as a credit or debit card having a length in the horizontal direction of 3.375 inches, a height in the vertical direction, as illustrated in FIG. 1 of 2.125 inches, and a thickness, without including the embossing height of 0.030 inches. The card also has rounded corners with a 0.125 inch radius. Other implementations of card 10 have a thickness of 0.042 inches and 0.060 inches not including embossing. The thickness of the card depends upon the components utilized. Card 10 includes a keyboard 12 for entering data and a display 14 for displaying data and prompting additional entries. Identification legends 16, 18 identify the card manufacturer and issuing agency. Alternatively, a picture 20 of the card carrier can be placed in the position of legend 18.

FIG. 2 is a back view of the unitary self-contained card illustrated in FIG. 1. As illustrated in FIG. 2, card 10 includes machine readable indicia such as a magnetic stripe 22 which is commonly used on standard credit and debit cards. Such machine readable indicia can take the form of optical, magnetic, or any other machine readable data, but for purposes of simplicity will be referred to herein as a magnetic stripe. A signature line 24 is additionally included on the reverse side below magnetic stripe 22. Embossing also appears on the card 10 in the standardized embossing format. The embossing appears as embossed account number 26, embossed expiration date 28 and embossed name 30. Magnetic stripe 22 and embossing 26, 28, 30 all appear in accordance with the ANSI financial transaction card embossing and magnetic stripe specifications so that the card can be used in conventional consumer transactions.

FIG. 3 is a schematic block diagram of the electrical components of the present invention disposed on card 10. As illustrated in FIG. 3, keypad 12 and display 14 comprise two of the electrical components illustrated in FIG. 1. Additionally, power source 32 is disposed within the structure of card 10 as well as microprocessor 34 and input/output port 36. Each of these components is constructed to be sufficiently thin to provide a card with a thickness of 0.030 inches not including the embossing. This corresponds to the standard thickness for a credit card.

FIG. 4 illustrates an example of a layout of the components illustrated in FIG. 3 on the unitary self-contained card 10. Power source 32 is connected to printed circuit board 38 by way of connectors 42, 44. Printed circuit board 38 has a series of connectors for connecting the pins of microprocessor 34, liquid display crystal 14, connectors of keyboard 12 and discrete components 46. Printed circuit board 38 also connects microprocessor 34 to input/output port 36. Card backing 40 provides a surface for supporting printed circuit board 38. A card top 48, as illustrated in FIG. 5, is laminated over printed circuit board 38 and card backing 40 to provide a single card structure. Keypad 12 includes the 10 digits required for numerical entries as well as an enter button 50, a clear button 52 and on-button 54 and an off-button 56. Discrete components 46 comprise resistors and capacitors necessary to operate the circuitry illustrated in FIG. 4.

FIG. 5 is a schematic end view assembly drawing of card 10. Card 10 comprises a card backing 40, printed circuit board 38 and a card top 48. These pieces are laminated together using an adhesive which is sufficiently strong to cause physical alteration and destruction of the card upon disassembly. Additionally, power source 32 can comprise a wafer-type battery which becomes destroyed upon attempted disassembly of the laminated layers illustrated in FIG. 5, resulting in inoperability of the circuitry of card 10 and destruction of memory content of microprocessor 34.

Card backing 40 comprises a structural layer on which the embossing 26, 28, 30 is placed. Card backing 40 has sufficient strength in thickness to protect the electronic components on printed circuit board 38 during use of the card 10 in an imprinting machine. Card backing 40 also provides sufficient vertical displacement of the electronics from the embossing to provide protection during imprinting. Alternatively, the circuitry of printed circuit board 38 can be laterally displaced from the location of the embossing on card backing 40. Microprocessor 34 has arithmetic and logical computation capabilities, program memory wherein a device control program is stored and data memory used by the control program as a scratch pad to store both confidential and non-confidential information pertaining to card 10. Microprocessor 34 can be implemented to perform the functions disclosed herein and can additionally operate as a clock and/or a calculator in combination with the functions programmed to be performed herein. The semiconductor chip utilized in accordance with the present invention has sufficient storage capacity to also operate as a calculator and/or clock. Alternatively, a separate integrated circuit chip 37 could be disposed in the card to perform clock and/or calculator functions, such as illustrated in FIG. 3. Any commercially available chip used for performing both calculator and clock functions can be used.

As stated above, the data memory can be of the volatile type which is erased whenever power is removed from the circuit or the non-volatile types such as an electronically erasable programmable read only memory (EEPROM). The microprocessor contains circuitry for generating the proper voltage levels to drive the liquid crystal display 14. Power source 32 can comprise a three volt lithium cell for use with volitile and non-volitile type memories in microprocessor 34, or a photovoltaic cell (solar cell) if a non-volatile type of memory is used.

FIG. 6 is a schematic diagram of circuitry which can be used in the unitary self-contained card 10 of the present invention. As illustrated in FIG. 6, a microcomputer is utilized such as NEC 7502 available from NEC Electronics Inc., 10080 North Wolfe Road, SW3, Suite 290, Cupertino, Calif. 95014. The NEC 7502 has dimensions of 0.97 inches by 0.74 inches by 0.09 inches thick. Other microprocessing devices are available which have a smaller thickness and which are suitable for producing a card having a total thickness of 0.030 inches not including the embossing. Similarly, liquid crystal display 14 can comprise an Epson B 615 LCD having a thickness of 0.064 inches. The Epson B 615 comprises an eight digit triple multiplexed seven segment liquid crystal display having low power consumption characteristics. Alternatively, eight digit, seven segment liquid crystal displays are available which have a thickness of 0.020 of an inch to allow construction of a card having a thickness of 0.030. Liquid crystal display 14 is connected to a microprocessor 34 by way of 27 pin connectors 50. A three volt lithium battery 32 provides power to microprocessor 34 by way of input $V_{dd}$. The ground connection of microprocessor 34 is connected to input $V_{ss}$. Ground is also supplied to input/output port 36 by way of connector 52. Input/output port 36 has three port connections which provide a means for programming microprocessor 34 with both program data and user data. Alternatively, program data can be supplied in read-only memory during construction. The positive output of three-volt lithium battery 32 is connected to a series of one hundred kohm and two hundred kohm resistors and 0.001 microfarad capacitors which are coupled to microprocessor 34. These discrete components provide for proper biasing and operation of microprocessor 34.

The positive output of three-volt lithium battery 32 is also applied to on-switch 54 and off-switch 56. Off-switch 56 is shunted to ground through 10 kohm resistor 68 so that a signal is applied to input 70 of microprocessor 34 to power down microprocessor 34. Similarly, on-switch 54 is shunted to ground by 10 kohm resistor 72 such that a signal applied through input 74 of microprocessor 34 to power up and reset microprocessor 34 for operation. A series of inputs 76 are applied to microprocessor 34 from keypad 12 which function as the data entry inputs as well as the enter and clear signals. Resistors 78 are connected to keypad 12 to provide proper operation of keypad 12. Capacitor 80 and resistor 82 provide the proper RC time constant for clock inputs 84, 86 of microprocessor 34.

FIG. 7 is a flow diagram illustrating the function of the circuitry illustrated in FIG. 6. As shown in FIG. 7, when the device is reset by pressing on-key 54, the control program checks to see if the card has been programmed for a specific user. If not, a check is made to determine if the card is connected to a program device. If such a device is connected to the card, then the programming of the card proceeds as illustrated in FIG. 8. The card has already been programmed, then a check is made by the program to determine if the card has been invalidated because the number of allowed attempts to enter the personal identification code (PIN) was exceeded in a previous transaction. If it is determined that the card is invalid, a message is then displayed on card display 14 indicating the card is invalid. The card is then powered down and rendered inoperative for further use. If, however, the card is still valid because the number of entries of the PIN number has not been exceeded, a check is made to determine if the card is being used after the issue date and before the expiration date. If it is determined that the card has expired in a previous transaction, a message is displayed on display 14 indicating the card is expired. The card is then powered down.

If however, the card has not expired, the device proceeds by prompting the card holder to enter his personal identification number (PIN). Prompting is provided by displaying a message (ENTER PIN) on display 14. The card user is then expected to enter the personal identification number (PIN) using keypad 12. The entered personal identification number (PIN) is then compared with the personal identification number (PIN) stored in memory during programming of the device. If there is an incorrect match of the two personal identification number (PIN)s, the number of consecutive wrong guesses is incremented by one. A check is performed to determine if the maximum allowable number of guesses has been exceeded. If it has been, the card is invalidated by setting the invalid flag and a message is displayed on the device's display indicating that the card is invalid. The card is then powered down and disabled from further use.

If, however, the maximum allowable number of attempts to enter the personal identification number (PIN) has not been exceeded, the program returns to prompt the user to enter the personal identification number (PIN) by displaying "ENTER PIN" on display 14. If, however, the two personal identification numbers (PIN) match, then the card is valid and the program proceeds by displaying the card account number that was programmed into the data memory. Display of the card account number allows visual comparison of the account number stored in data memory with the account number embossed in the back of the card. Comparison of the two account numbers prevents fraudulent tampering of the account number embossed on the card since the embossed number is the number which will be used for billing purposes on the hard copy in the imprinting machine.

After the account number stored in memory is displayed, a transaction identification code (TIC) is computed by microprocessor 34 and displayed on display 14. Computation of the transaction identification code (TIC) is accomplished in the following manner. First, microprocessor 34 produces a transaction key number (KLM) which varies with each transactional use of the card. This transaction key number (KLM) can be incremented in a counter upon proper entry of the personal identification number (PIN) or generated in any desired manner with the only requirement being that it does not remain constant. The transaction identification code (TIC) is computed as a function of transaction key number (KLM). Since the transaction key number (KLM) varies for each transactional use of the card, the transaction identification code (TIC) also varies for each transactional use of the card. In credit and debit transactions, the transaction identification code (TIC) is recorded by a merchant on the transaction voucher. The transaction identification code (TIC) can also be entered in an automatic teller machine to verify the validity of the transaction. The function from which the transaction identification code (TIC) is generated can comprise an algorithm (N) stored in microprocessor 34. The algorithm (N) stored in microprocessor 34 functions to compute an algorithmic code number (XYZ) which is combined or scrambled with the transaction key number (KLM) in a predetermined order to produce the transaction identification code (TIC). By knowing both the preselected order of scrambling of the algorithmic code number (XYZ) and transaction key number (KLM) as well as the algorithm (N), the transaction identification code (TIC) can be checked in a manner similar to a parity check to determine the validity of the transaction identification code (TIC). This prevents fraud by merchants who attempt to use stolen or forged credit cards to bill financial institutions for purchases that did not take place since the merchants will not be aware of the algorithm (N) or the scrambling order and will be unable to produce valid transaction identification codes (TIC). A peripheral device such as an automatic teller machine, access control device or other device can also determine the validity of the transaction identification code (TIC) to validate the use of the card in a transaction. Of course, such devices would also require the entering of the personal identification number (PIN) for validating operation. The algorithm (N) utilized should be of a reasonable complexity so that the resulting code cannot be deduced by observing several codes generated by different transactions.

The algorithm (N) can also be a function of the account number or the personal identification number (PIN) to add a second degree of encryption to the algorithm (N). After the merchant code is displayed, a prompting signal comprisiong "DATE" is displayed. To prompt the entering of the current date, i.e., the date of the transaction.

FIG. 8 is a continuation of the flow diagram of FIG. 7. After the prompting signal "DATE" is displayed on display 14, the date of the transaction is entered in keypad 12. For security purposes, the card 10 is normally handed to the merchant or other authorized person for entry of the date. If the clear key 52 is pressed at any time during the entry of the date in keypad 12, microprocessor 34 interprets this as an operator error and the program returns to the "DATE" prompt. When the date is entered, the program compares the date of issue that is stored in the card's data memory during programming. If the entered date is less than the date of issue, a signal "EARLY" is displayed on display 14 indicating that the card cannot be used yet. If, however, the entered date is greater than, or equal to, the date of issue of the card, the program proceeds to determine if the entered date is greater than the expiration date of the card which is stored in the card's data memory during programming. If the entered date is greater than the expiration date, the card has expired and the flag is set in data memory to indicate expiration. This card then displays an "EXPIRED" message on the display and the card is powered down. If the date is less than or equal to the expiration date, a "GOOD" message is displayed on the card's display indicating that the card is completely valid and the transaction is complete.

FIG. 9 is a flow chart illustrating the method in which the semiconductor data memory of microprocessor 34 is programmed with confidential or non-confidential information. Programming occurs in programming machine 90 as illustrated in FIG. 10. As illustrating in FIG. 10, the magnetic stripe 22 of card 10 is programmed with both confidential and non-confidential information in magnetic stripe recorder 92. This occurs prior to application of the card top 48. Card 10 is then physically transferred to programming machine 90 which accesses the microprocessor 34 through input/output port 36 which remains exposed since card top 48 has not been applied to printed circuit board 38 mounted on card backing 40. Once the microprocessor 34 is programmed in accordance with the flow diagram illustrated in FIG. 9, the card 10 is then physically transferred to a laminating machine 94 where card top 48 is applied as a laminate structure to produce a finished card.

The process of programming the card, as stated above, is disclosed in FIG. 9. Since it is desired that card 10 be used by a particular user, programming machine 90 function to read the confidential and non-confidential information which has been stored on the magnetic stripes by the conventional magnetic stripe recorder 92. Programming machine 90 translates the data it reads from the magnetic stripe 22 into binary form and transmits this information to microprocessor 34 which functions to store the data in data memory after it initializes such memory. After all of the data is stored in memory, microprocessor 34 verifies that the data matches with that contained in the programming machine. This is accomplished by having the microprocessor read the data from the data memory and from the programming machine memory through the input/output port 36. The data is compared and if positive verification is not provided, the programming procedure is repeated. If the data does favorably compare, the device is initialized by setting the invalid flag to valid, the expired flag to not expired, and the number of attempts to enter the personal identification number (PIN) to zero. Programming machine 90 then erases the confidential data from magnetic stripe 22 to prevent unauthorized access to the confidential information. After the erasure of confidential information is verified, the programming process is completed and an initialization flag is set to prevent further programming. This prevents unauthorized reprogramming of the card 10. Since the magnetic stripe 22 contains four separate lines of magnetic data and, presently, the fourth line is not used, the confidential data is stored on the fourth line. This allows easy erasure of the confidential data without the risk of erasure of the non-confidential information which remains on the other three magnetic stripes. Again, magnetic stripes are used for exemplary purposes only and any desired machine readable indicia could be used in place of the magnetic stripe information.

FIG. 11 comprises a flow chart disclosing an optional process to be performed by microprocessor 34 in the flow diagram illustrated in FIG. 8. As disclosed in FIG. 11, a prompt signal "AMOUNT" is generated on display 14 to prompt entry of the amount of the transaction into keyboard 12. The transaction amount is then read and stored in the microprocessor memory. This transaction amount is then compared with the credit limit stored in the microprocessor and if greater than the credit limit, a display is generated indicating "INVALID" amount. The card is then powered down and the program is ended. If the transaction amount is less than the credit limit, a display is generated "VALID AMOUNT" and a new credit limit balance is generated by subtracting the transaction amount from the credit limit balance. The card is then powered down and the process ended.

FIG. 12 comprises a flow diagram disclosing the generation of a transaction identification code (TIC) wherein it is assumed that the transaction key number is a three digit decimal number: "KLM". FIG. 12 illustrates the functions performed in the "COMPUTE TIC" step, illustrated in FIG. 7. "N" comprises an algorithm which is a function of the transaction key number (KLM). The algorithmic code number generated from the algorithm "N" is expressed as a three-digit number "XYZ" where "XY" and "Z" are decimal digits. The account number is expressed as a three-digit number "ABC," while the personal identification number (PIN) is expressed as a three digit number "DEF". FIG. 12 comprises one example of the implementation of an algorithm to produce a transaction identification code (TIC). Initially, an algorithm (N) is computed by using the first digit "A" of the account number and multiplying it by the transaction key number (KLM) and adding that result to the transaction key number (KLM) divided by the second digit "B" of the account number and then subtracting the third digit "C" of the account number. The algorithmic code is then converted to binary coded decimal (BCD) format to produce a three digit algorithmic code number "XYX". The algoriothmic code number (XYZ) can also be computed by an algorithm (N) which is dependent upon the personal identification number (PIN) "DEF" rather than the account number "ABC" to add to another level of security to the system.

The manner in which the transaction identification code (TIC) is scrambled is then determined by the personal identification number (PIN). If the personal identification number (PIN) is less than a predetermined number such as 100, the transaction identification code (TIC) is scrambled in accordance with a first predetermined scrambling arrangement. If the personal identification number (PIN) is less than 200 and greater than 100, the transaction identification code (TIC) is scrambled in a second predetermined scrambling order as illustrated in FIG. 12. This process continues until the personal identification number (PIN) is compared with a number "G" which is the maximum allowed value for the personal identification number (PIN). If it is less than "G", a second to last scrambling order is used, and if it is equal to "G", a last scrambling order is used. Consequently, by knowing the scrambling order, the transaction key number "KLM" can be extracted from the transaction identification code (TIC) so that the transaction identification code (TIC) can be verified by computing the algorithmic code number "XYZ" from the algorithm (N) stored in microprocessor 34.

FIG. 13 is a schematic illustration of a peripheral device 96 which can comprise an automatic teller machine and access control device or other peripheral device. Peripheral device 96 includes a screen 98 for displaying information and a keypad 100 for entering information. In accordance with the present invention, the peripheral device 96, when employed as an access control device, can be used with or without a security guard. When used in conjunction with a security guard, the security guard verifies the correct entry of the personal identification number (PIN) on the unitary self-contained card 10 as well as the valid and expiration dates of the card. The guard also compares the account number, e.g., employee serial or staff number stored in memory with the account number appearing on the card. The term "account number" is herein defined as any identifying number associated with the card such as an employee identification number, and is not intended to be limited to a commercial account number. The security guard then inserts the card 10 in peripheral device 96 and compares the account number stored in memory in the card 10 with the account number read from on the magnetic stripe 22 and displayed on the screen 98 of the peripheral device 96. The transaction identification code (TIC) can also be entered through keypad 100 together with the personal identification number (PIN) to verify the personal identification number (PIN) with the account number read from the magnetic stripe to verify the authenticity of the transaction identification code (TIC). The peripheral device can also compare the account number of the card with stored account numbers to determine the validity of the card account number. In this manner, a great deal of security can be provided through the use of the unitary self-contained card 10 in conjunction with a peripheral device.

When peripheral device 96 is utilized as an automatic teller machine, both the personal identification number (PIN) and the transaction identification code (TIC) are required to be entered through keypad 100 to obtain money from the automatic teller machine. The automatic teller machine functions to compare the account number read from the magnetic stripe 22 on card 10 with stored account numbers to validate use of the card 10. Additionally, the personal identification number (PIN) and the transaction identification code (TIC) function to verify proper use of the card 10.

FIG. 14 illustrates a card validation device 102. Card 10 can be inserted through card reader slot 104 which reads the magnetic stripe from the back of the card. A person validating the card can compare the account number appearing on screen 106, which is read from the magnetic stripe of card 10, with the account number appearing on the display 14 of the card and the embossed number of the card. If all three account numbers correspond, the account number read from the card can be compared electronically with the stored account numbers to validate use of card 10. Keypad 108 can additionally be used for entering the transaction identification code (TIC) and/or the personal identification number (PIN) to verity proper use of card 10 by verifying the validity of the transaction identification code.

Consequently, the present invention provides a unitary self-contained transaction card which can be used in commercial transactions as debit or credit cards, in conjunction with automatic teller machines to obtain currency, as an identification card for access control and various other transaction and identification functions. Since the present invention is a unitary and self-contained card, there is no communication with a peripheral device which would compromise security of the system. A personal identification number (PIN) can be entered directly into the card and compared with a stored personal identification number (PIN) to verify use of the card. Additionally, a transaction identification code (TIC) can be generated by the card which can be later verified from the transaction identification code (TIC) is a function of a transaction key number which is included in the transaction identification code (TIC) to allow self verification of the transaction identification code (TIC) by knowing the position of the transaction key number within the code and the algorithm used to produce the function. The algorithm can be derived from the personal identification number (PIN) or the account code to add a second level of encryption. The unitary self-contained card 10, when used in conjunction with peripheral devices such as automatic teller machines adds an additional level of security to transactions by requiring entry of the transaction identification code (TIC) to validate the transaction. Self verification of the account number stored on the magnetic strip of the card is provided by display of the account number on the card display to allow visual comparison of the displayed account number and the account number appearing on the card. The account number read from the magnetic stripe of the card can be compared with stored account numbers to validate use of the card. Visual comparison of the account number read from the magnetic stripe of the card and the account number displayed on the display of the card prevents alteration of the magnetic stripe to gain authorization.

What is claimed is:

1. A unitary, self-contained card capable of storing and generating information independently of systems external to said card to verify proper use of said card comprising:
- data entry means for entering a personal identification number into said card;
- electronic memory means for storing a predetermined personal identification number associated with said card and an encryption algorithm (N);
- data processing means comprising:
  - means for comparing said personal identification number entered through said data entry means with said predetermined personal identification number stored in said electronic memory means to generate a PIN validation signal upon favorable comparison of said personal identification number entered through said data entry means and said predetermined personal identification number stored in said electronic memory means;
  - means for generating a transaction key number (KLM) which is generated in response to said PIN validation signal and which is different each time said PIN validation signal is generated;
  - means for generating an algorithmic code number (XYZ) from said transaction key number (KLM) in accordance with said encryption algorithm (N);
  - means for generating a transaction identification code number (TIC) from said transaction key number (KLM) and said algorithmic code number (XYZ);
  - means for displaying on said card said transaction identification code (TIC) so that the validity of said use of said card can be verified by knowing said encryption algorithm (N) and by identifying said transaction key number (KLM) and said algorithmic code number (XYZ) in said transaction identification code (TIC) and verifying said algorithmic code number (XYZ) by deriving said algorithmic code number (XYZ) from said transaction key number (KLM) and said encryption algorithm (N).

2. The card of claim 1 further comprising:
- means for entering a transaction data representative of the date of said consumer transaction through said data entry means for storage in said electronic memory means;
- means for storing a predetermined expiration date in said electronic memory means representative of the date of expiration of said card;
- means for comparing said transaction date and said expiration date in said logic circuit means to produce a date validation signal; and,
- means for displaying said date validation signal on said display means.

3. The card of claim 1 further comprising:
- means for generating an account number display signal to display an account number stored in said semiconductor memory means corresponding to the account number of said card so as to allow visual comparison of said account number display signal with an account number appearing on said card to verify said account number appearing on said card.

4. The card of claim 1 wherein said encryption algorithm (N) comprises:
- an algorithm having mathematical operations which are a function of said account number of said card.

5. The card of claim 1 wherein said encryption algorithm (N) comprises:
- an algorithm having mathematical operations which are a function of said personal identification number.

6. A unitary, self-contained card capable of producing self-validating verification information to verify authorized use of said card comprising:
- keyboard means disposed on said card for entering a personal identification number into said card;
- electronic memory means disposed in said card for storing a predetermined personal identification number associated with said card and for storing a predetermined algorithm;
- electronic logic means for comparing said personal identification number entered through said keyboard means with said predetermined personal identification number stored in said electronic memory means to generate a PIN validation signal upon favorable comparison of said personal identification number entered through said keyboard means and said predetermined personal identification number stored in said electronic memory means;
- means for generating a transaction key number in response to said PIN validation signal, said transaction key number having a value which is different each time said transaction key number is generated;
- means for generating a transaction identification code from said predetermined algorithm and said transaction key number;
- means for indicating on said card said transaction identification code so that the validity of said use of said card can be verified by knowing said predetermined algorithm and by identifying said transaction key number in said transaction identification code so that said transaction key number can be used in said predetermined algorithm to determine the validity of said transaction identification code.

7. The card of claim 6 wherein said data processing means comprises:
- logic means for comparing preselected card verification data including issue and expiration dates of said card with card user data including a transaction date of use of said card;
- means for generating a date verification signal for display on said card display means whenever said transaction date falls between said issue and expiration dates.

8. The card of claim 6 further comprising:
- means for storing a PIN attempt number in said electronic memory means representative of the maximum number of incorrect attempts allowed to enter said personal identification number (PIN);
- means for accumulating incorrect attempts to enter said personal identification number (PIN) in said card to produce an accumulated attempt number;
- means for comparing said PIN attempt number with said accumulated attempt number in said data processing means to disable further use of said card when said accumulated number exceeds said PIN number.

9. The card of claim 6 further comprising:
- means for storing a credit limit balance in said electronic memory means;
- logic means for comparing said credit limit balance with a transaction amount of a credit transaction entered through said data entry means;
- means for generating a credit verification signal whenever said transaction amount is less than said credit limit balance;

means for generating a credit invalid signal whenever said transaction amount is greater than said credit limit balance;

means for decrementing said credit limit balance by said transaction amount to provide an updated credit limit balance.

10. The card of claim 6 wherein said data processing means further comprises:

means for generating an account number display signal for displaying an account number stored in said electronic memory means corresponding to said account number of said card to allow visual comparison of said account number stored in said electronic memory means with an account number embossed on said card to verify said account number embossed on said card.

11. The card of claim 6 further comprising:
clock means for providing clock information through said means for displaying.

12. The card of claim 6 further comprising:
calculator means for allowing said card to operate as a calculator.

13. The card of claim 6 wherein said encryption algorithm is a function of said preselected card verification data.

14. The card of claim 6 wherein said encryption algorithm is a function of said personal identification number stored in said electronic memory means.

15. The card of claim 6 wherein said encryption algorithm is a function of said account number stored in said electronic memory means.

16. The card of claim 6 wherein said card is adapted for use with a device for automatically dispensing currency.

17. The card of claim 6 wherein said card is adapted for use with an access control device.

18. The card of claim 6 wherein said electronic memory means comprises a non-volatile type memory which does not require application of power to sustain its memory content and said card further comprising:
power source means disposed on said card for supplying an intermittent supply of power.

19. The card of claim 6 wherein said electronic memory means comprises a volatile type memory requiring constant application of power from a power source to sustain memory content and said card further comprising:
power source means disposed in said card such that disassembly of said card destroys said power source means and erases said memory content of said electronic memory means.

20. The card of claim 1 wherein said data processing means further comprises:
means for scrambling said transaction key number (TN) and said algorithmic code number (N) in a preselected scrambling order so that said transaction identification code (TIC) can be verified by knowing both said encryption algorithm (N) and said preselected scrambling order.

21. The card of claim 20 wherein said preselected scrambling order is a function of an account number of said card.

22. The card of claim 20 wherein said preselected scrambling order is a function of said predetermined personal identification number.

23. The card of claim 1 further comprising:
means for storing a credit limit balance in said electronic memory means;
logic means for comparing said credit limit balance with a transaction amount of a credit transaction entered through said data entry means;
means for generating a credit verification signal whenever said transaction amount is less than said credit limit balance;
means for generating a credit invalid signal whenever said transaction amount is greater than said credit limit balance;
means for decrementing said credit limit balance by said transaction amount to provide an updated credit limit balance.

24. The card of claim 6 further comprising:
means for scrambling said transaction identification code in a preselected scrambling order so that said transaction key number can be identified from said transaction identification code by knowing said predetermined scrambling order, and said transaction identification code can be self-validated by knowing said algorithm.

25. A unitary, self-contained card capable of producing a transaction identification code to verify authorized use of said card comprising:
keyboard means disposed on said card for entering a personal identification number into said card;
electronic memory means disposed in said card for storing a predetermined personal identification number associated with said card and for storing a predetermined algorithm;
electronic logic means for comparing said personal identification number entered through said keyboard means with said predetermined personal identification number stored in said electronic memory means to generate a PIN validation signal upon favorable comparison of said personal identification number entered through said keyboard means and said predetermined personal identification number stored in said electronic memory means;
means for generating a transaction key number in response to said PIN validation signal, said transaction key number having a value which is different each time said transaction key number is generated;
means for generating a transaction identification code from said predetermined algorithm and said transaction key number;
means for indicating on said card said transaction identification code so that the validity of said use of said card can be verified by knowing said predetermined algorithm.

26. The card of claim 24 wherein said means for generating a transaction key number comprises means for generating a transaction key number having a predetermined sequential order.

27. The card of claim 24 wherein said means for generating a transaction key number comprises means for generating a transaction key number which is randomly generated.

* * * * *